United States Patent [19]
Yoshida

[11] Patent Number: 6,021,183
[45] Date of Patent: Feb. 1, 2000

[54] COMMUNICATION APPARATUS AND METHOD HAVING V. 8 PROCEDURE FUNCTION

[75] Inventor: Takehiro Yoshida, Tokyo, Japan

[73] Assignee: Canon Kabushiki Kaisha, Tokyo, Japan

[21] Appl. No.: 08/958,991

[22] Filed: Oct. 28, 1997

[30] Foreign Application Priority Data

Oct. 29, 1996 [JP] Japan .................................. 8-286647

[51] Int. Cl.⁷ ................................................. H04M 11/00
[52] U.S. Cl. .................................. 379/93.08; 379/100.17
[58] Field of Search .................. 379/93.01, 93.05–93.09, 379/93.14, 93.15, 93.26–93.32, 93.34, 100.01, 100.12–100.15, 100.17

[56] References Cited

U.S. PATENT DOCUMENTS 5,721,731  2/1998  Yoshida .

FOREIGN PATENT DOCUMENTS 0 724 355   7/1996   European Pat. Off. .
7-298024   11/1995   Japan .
7-298027   11/1995   Japan .

*Primary Examiner*—Wing F. Chan
*Attorney, Agent, or Firm*—Fitzpatrick, Cella, Harper & Scinto

[57] ABSTRACT

According to a this invention, a line is acquired in response to reception from the line. An ANSam signal of a V. 8 procedure is sent out to the line in response to acquisition of the line. When a CM signal is received within a predetermined period of time after the start of sending out of the ANSam signal, the V. 8 procedure sequence is continued. When the CM signal is not received within the predetermined period of time, sending of the ANSam signal is stopped, and the sequence is shifted to a sequence using another communication procedure (T. 30 procedure) different from the V. 8 procedure. The predetermined period of time for monitoring reception of the CM signal while sending out the ANSam signal is changed in accordance with the execution state of the communication sequence. Upon automatic reception, the V. 8 procedure can be appropriately executed, and a shift in sequence from the V. 8 procedure to another communication procedure (e.g., T. 30 procedure) can be performed within a short time period.

18 Claims, 10 Drawing Sheets

COMMUNICATION APPARATUS AND METHOD HAVING V. 8 PROCEDURE FUNCTION

BACKGROUND OF THE INVENTION

1. Field of the Invention

The present invention relates to a communication apparatus having the V. 8 procedure function for specifying a type of modem used in communication in line connection with a partner.

2. Related Background Art

In recent years, various types of communications such as computer communications and facsimile communications through a public telephone line have been performed. Modulators/demodulators called modems are used in these communications. In this case, no communications are performed unless the type of modem in a transmission apparatus is the same as that in a reception apparatus. The transmission rate of a modem and the modulation scheme have been set using the facsimile communication procedures, and computer communications using modems have been popular. For this reason, demand has arisen for specifying the types of modems of the transmitter and receiver.

Under the above circumstances, the V. 8 procedure is newly recommended from ITU as a procedure for specifying a modem used in communication.

When this V. 8 procedure is used for a facsimile apparatus having an image communication function using the conventional T. 30 procedure and an image communication function (V. 34 procedure) using a 28.8-kbps high-speed modem, the following sequence can be proposed.

The receiving side (called subscriber side) is connected to the line in response to a reception and starts sending out an ANSam signal (a 2,100-Hz modified response tone signal representing the V. 8 recommendation) 0.2 sec after the line connection. The receiving side receives a CM signal (originating menu signal that represents an available modulation scheme) from the transmitting side (calling subscriber side) while sending out the ANSam signal.

The transmitting side monitors the presence/absence of reception of the ANSam signal from the receiving side within a predetermined period of time after origination. When the ANSam signal is received within the above predetermined period of time, the transmitting side transmits the CM signal. On the other hand, when the transmitting side does not receive the ANSam signal within the predetermined period of time, the transmitting side transmits a CI signal (originating representation signal) representing the V. 8 procedure.

When the receiving side receives the CM signal within a predetermined period of time (5±1 sec complying with the recommendation) from the start of sending out the ANSam signal, the receiving side stops transmitting the ANSam signal and transmits a JM signal (a common menu signal which represents an available modulation scheme common to the originating and reception sides).

Upon reception of the JM signal, the transmitting side transmits a CJ signal (a signal representing confirmation of detection of the JM signal and the end of the CM signal). In response to this, the transmitting side ends the V. 8 procedure sequence and advances to a data communication sequence using a modem in which the originating function category of the transmitted CM signal coincides with that of the received JM signal.

The receiving side stops sending out the ANSam signal when it does not receive the CM signal within the predetermined period of time. The receiving side then monitors reception of the CI signal from the transmitting side. Upon reception of the CI signal, the receiving side sends out the ANSam signal again. When the receiving side receives no CI signal, the receiving side transmits a DIS signal of the T. 30 procedure (i.e., this signal contains information having the V. 8 procedure function) and waits until the CI signal of the V. 8 procedure or the DCS signal of the T. 30 procedure is received from the transmitting side. Upon reception of the CI signal, the receiving side sends out the ANSam signal. Upon reception of the DCS signal, the receiving side performs an image communication sequence according to the T. 30 procedure.

In the above procedure, when the transmitting side is a normal facsimile apparatus of the T. 30 procedure, the receiving side sends out the ANSam signal for about 5 sec, and transmits the DIS signal after it confirms that neither the CM signal nor the CI signal are received from the transmitting side. Therefore, the T. 30 procedure is started.

Most of the facsimile communications are performed by the normal facsimile apparatus of the T. 30 procedure.

Even if the V. 8 procedure function is provided, the operation preferably returns to the T. 30 procedure within a minimum time period.

On the other hand, the sufficient detection time of the ANSam signal at the transmitting side is about one sec. The apparatus at the receiving side can receive a CM signal after about 2.2 sec in a line having a large communication delay between the terminals (e.g., satellite communication using a satellite).

The sending time of the ANSam signal at the receiving side is set to about 3 sec, so that the shift time to the T. 30 procedure can be advanced.

However, when the receiving side (called subscriber side) acquires the line in response to detection of a call signal from the line, a switching unit of a network inverts the line polarity. In the network of this switching unit, when the receiving side acquires the line, the line polarity is inverted. Noise is generated on the line by this polarity inversion, and the transmitting side may not normally receive the ANSam signal at the transmitting side upon polarity inversion.

For this reason, when the sending time of the ANSam signal is set to about 3 sec, and the switching unit of the network is of a polarity inversion type, the receiving side cannot receive the CM signal within 3 sec. As a result, after the CI signal is transmitted, the ANSam signal must be transmitted again, thereby prolonging execution of the V. 8 procedure.

SUMMARY OF THE INVENTION

It is an object of the present invention to improve a communication apparatus in consideration of the above problem.

It is another object of the present invention to allow a change in sending time of an ANSam signal sent upon a reception in accordance with a communication network to which a communication apparatus having the V. 8 procedure function is connected.

In order to achieve the above objects, there is provided a communication apparatus in which a communication line is acquired in response to a reception from the communication line, and an ANSam signal of a V. 8 procedure is sent out to the communication line in response to acquisition of the communication line; when a CM signal is received within a predetermined period of time after the start of sending the ANSam signal, the V. 8 procedure sequence is continued; and when the CM signal is not received within the predetermined period of time, sending of the ANSam signal is stopped, and the V. 8 procedure sequence shifts to any other communication procedure sequence, comprising changing means for changing the predetermined period of time to monitor reception of the CM signal while sending out the ANSam signal, thereby changing the predetermined period of time in accordance with a communication network to which the apparatus is connected.

The above and other objects, features, and advantages of the present invention will be apparent from the following detailed description of the invention in conjunction with the accompanying drawings.

DETAILED DESCRIPTION OF THE PREFERRED EMBODIMENT

A preferred embodiment of the present invention will be described in detail below with reference to the accompanying drawings.

Figure 1:
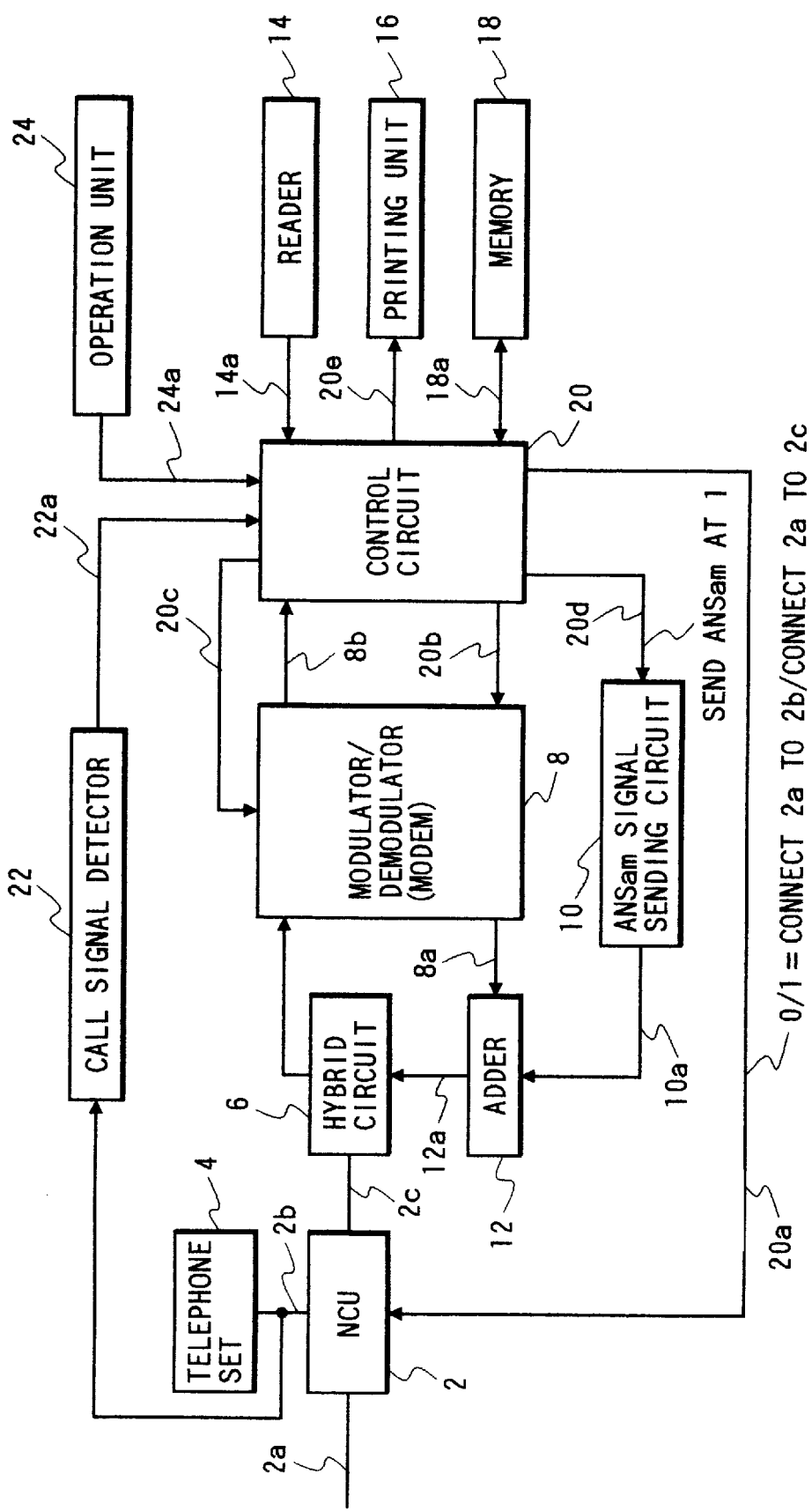
FIG. 1 is a block diagram showing the arrangement of a facsimile apparatus according to an embodiment of the present invention.

FIG. 1 is a block diagram showing the arrangement of a facsimile apparatus according to this embodiment.

An NCU (Network Control Unit) 2 switches a telephone line (telephone network) connected to a facsimile apparatus so as to connect the telephone line to a telephone set 4 or a facsimile communication unit (e.g., a modem) in order to use the telephone line for data communication (e.g., facsimile communication) and normal communication. The NCU 2 also performs connection control of the telephone switching network. In addition, the NCU 2 has a circuit arrangement for acquiring a loop of the telephone line in facsimile communication (data communication). The NCU 2 switches and connects a telephone line 2a to a telephone set 4 or the facsimile communication unit (signal level "0" for the telephone set 4; signal level "1" for the facsimile communication unit) in accordance with the signal level of a control signal (signal line 20a) from a control circuit 20. In the normal state, the telephone line 2a is connected to the telephone set 4.

A hybrid circuit 6 separates the signals of a transmission system from the signals of a reception system. A transmission signal from an adder 12 is sent out to the telephone line 2a through the hybrid circuit 6 and the NCU 2. A reception signal from the partner is input to a modulator/demodulator (modem) 8 through the telephone line 2a, the NCU 2, the hybrid circuit 6, and a signal line 6a.

The modem 8 modulates the transmission signal and demodulates the reception signal. The modem 8 has modulation/demodulation functions such as V. 8, V. 21, V. 27 ter, V. 29, V. 17, and V. 34 complying with the ITU-T recommendations. The modem 8 is operated in the modulation/demodulation mode designated by a control signal (signal line 20c) from the control circuit 20. The modem 8 modulates, in a designated modulation mode, transmission data sent out from the control circuit 20 through a signal line 20b, and outputs the modulated data to the adder 12. The modem 8 demodulates the reception signal from the hybrid circuit 6 in a designated demodulation mode and outputs the demodulated reception data to the control circuit 20 through a signal line 8b.

A circuit 10 sends out an ANSam signal defined in the V. 8 recommendation. The circuit 10 starts sending out the ANSam signal (start of sending the signal at signal level "1") and stops sending out the ANSam signal (stop of sending the signal at signal level "0") in accordance with a control signal (signal line 20d) from the control circuit 20.

The adder 12 receives the signal (signal line 8a) from the modem 8 and the ANSam signal (signal line 10a) from the ANSam signal sending circuit 10, adds these input signals, and outputs the sum signal to the hybrid circuit 6.

A reader 14 optically reads an original image, converts the optical image into an electrical signal, and outputs the electrical signal. The reader 14 includes a read sensor, a mechanism for relatively moving an original and the read sensor, and a signal processor for generating electrical read data.

A printing unit 16 prints image data on printing paper and is constituted by one of various printers such as a laser beam printer and an ink-jet printer.

A memory 18 stores data such as read image data, transmission image data, and received image data.

A call signal detector 22 is a circuit for detecting a call signal from the telephone line 2a. Upon detection of the call signal from the telephone line 2a, the call signal detector 22 outputs a detection signal (signal line 22a) to the control circuit 20.

An operation unit 24 has various keys for inputting instructions for setting various operation modes of the apparatus and operating the apparatus, and a display for displaying the operating state of the apparatus. The operation unit 24 has a key input arrangement for setting an automatic reception mode for automatically starting facsimile communication in response to detection of a call signal from the line and a manual reception mode for starting facsimile communication in response to depression of the start key (arranged in the operation unit) by an operator without automatically responding to the call signal from the line. Various key inputs are output to the control circuit 20. The control circuit 20 stores the reception mode set by the key input from the operation unit 24. When a call signal from the line is detected, the control circuit 20 executes the corresponding reception control in accordance with the stored reception mode information.

The control circuit 20 also serves as a controller for controlling the entire apparatus. The control circuit 20 comprises a microcomputer, a ROM storing control programs for the microcomputer, a RAM (backed up by a backup circuit) for storing various operation modes, and the like. The microcomputer executes each control program stored in the ROM to perform the control operation of the entire apparatus.

The arrangement of the facsimile apparatus of this embodiment has thus been described.

In the facsimile apparatus of this embodiment, assume that the apparatus is set in the automatic reception mode by the operation unit 24. In this case, when a call signal from the telephone line 2a is detected by the call signal detector 22, and a detection signal of the call signal is input to the control circuit 20, the control circuit 20 outputs a control signal to the NCU 2 to switch the line 2a from the telephone set 4 to the hybrid circuit 6 (facsimile communication unit), thereby acquiring the loop of the line 2a. The control circuit 20 causes the ANSam signal sending circuit 10 to start sending the ANSam signal 300 msec (this is not limited to 300 msec, but can be changed to a value set by a key input from the operation unit 24) after line acquisition. The control circuit 20 then monitors whether a CM signal of the V. 8 procedure is received by the modem 8 within a predetermined period of time (e.g., initially about 3 sec., i.e., a time shorter than 5±1 sec defined in the V. 8 recommendation). When the CM signal is not received within the predetermined period of time, the control circuit 20 causes the ANSam signal sending circuit 10 to stop sending the ANSam signal. The control circuit 20 then causes the modem 8 to send out, to the line 2a, a DIS signal (information representing the V. 8 procedure function is set) serving as a T. 30 procedure signal of the ITU-T recommendation as a communication procedure different from the V. 8 procedure. The control circuit 20 monitors reception of the CI signal of the V. 8 procedure from the modem 8 to the line 2a and reception of a DCS signal (response signal for the DIS signal) of the T. 30 procedure to the line 2a. Upon reception of the CI signal to the line 2a, the control circuit 20 causes the ANSam signal sending circuit 10 to send out the ANSam signal of the V. 8 procedure again. However, upon reception of the DCS signal, the control circuit 20 performs facsimile communication of the T. 30 procedure. As described above, in the normal settings, the predetermined period of time for monitoring reception of the CM signal while sending out the ANSam signal is set shorter than the time defined in the V. 8 procedure. When the partner does not have the V. 8 procedure, the procedure can shift to the T. 30 procedure within a short period of time.

In the above communication sequence, when the control circuit 20 executes, a predetermined number of times (or a predetermined ratio), a communication sequence for, upon reception of the DIS signal in automatic reception processing, receiving the CI signal of the V. 8 procedure and returning the V. 8 procedure again, the predetermined period of time for monitoring the CM signal while sending out the ANSam signal is changed from about 3 sec to the time (e.g., about 4 sec) complying with the definition of the V. 8 procedure. In the next reception cycle, the predetermined period of time is set to 4 sec, and reception of the CM signal is monitored while sending out the ANSam signal.

FIGS. 2, 3, 4, and 5 are flow charts showing a control operation of the control circuit 20 in the facsimile apparatus of this embodiment. The control operation shown in these flow charts is executed by the control programs stored in the ROM.

Figure 2:
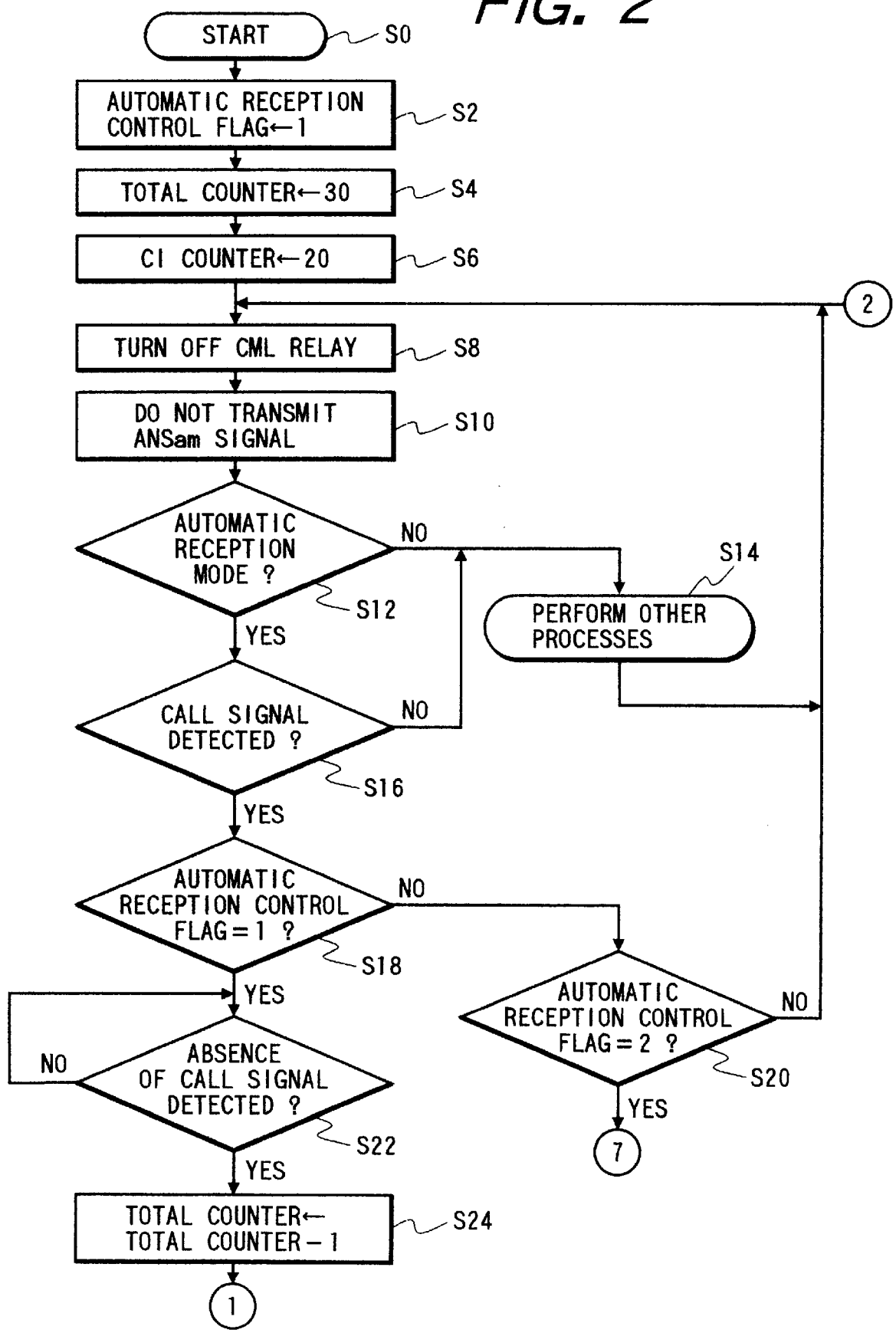
FIG. 2 is a flow chart showing a control operation of a control circuit of this embodiment.
Figure 3:
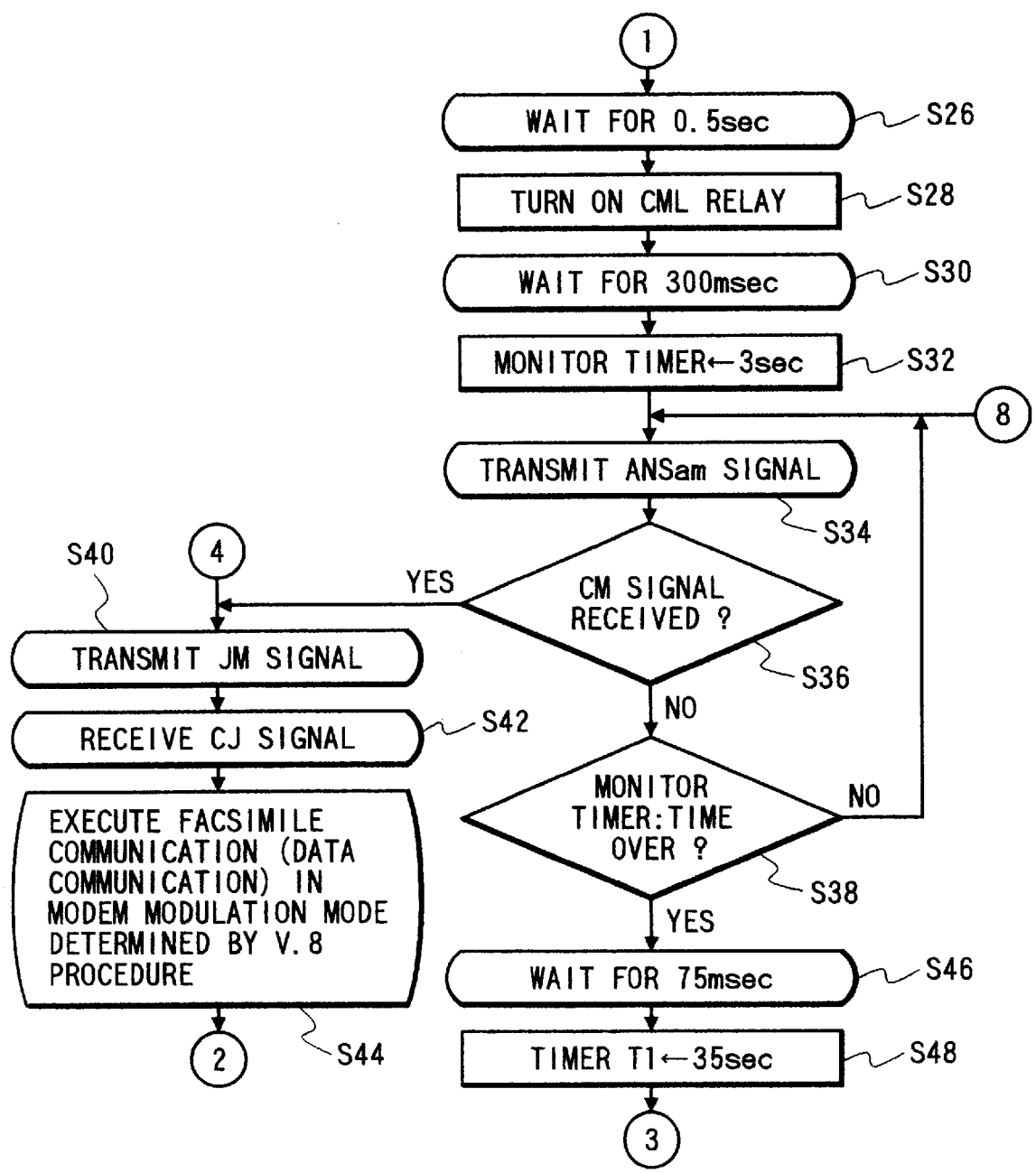
FIG. 3 is a flow chart showing the control operation of the control circuit of this embodiment.

In step S2 of FIG. 2, the control circuit 20 sets "1" in an automatic reception control flag (i.e., a flag set in the RAM) representing automatic reception control for automatically starting facsimile communication in response to detection of a call signal (when the value of the automatic reception control flag is set at "1", the predetermined period of time for monitoring reception of the CM signal while sending out the ANSam signal is set to 3 sec; and when the value of the flag is set at "2", the predetermined period of time is set to 4 sec). In step S4, the control circuit 20 sets the value of a total counter (arranged in the RAM) to "30" (this value is not limited to "30", but can be changed by a key input from the operation unit 24). The total counter is a counter for counting a total communication count serving as the denominator for determining the ratio of the communication sequence in which the procedure shifts from the T. 30 procedure to the V. 8 procedure upon reception of the CI signal.

In step S6, the control circuit 20 sets the value of a CI counter (arranged in the RAM) to "20" (this value is not limited to "20", but can be changed by a key input from the operation unit 24). The CI counter is a counter for counting the number of times of the communication sequence in which the procedure shifts from the T. 30 procedure to the V. 8 procedure upon reception of the CI signal in the total communication count ("30").

In step S8, the control circuit 20 outputs, to the signal line 20a, a control signal for turning off a CML relay (i.e., a relay for selectively connecting the telephone line 2a to the telephone set 4 or the facsimile communication unit) of the NCU 2, thereby connecting the line 2a to the telephone set 4. In step S10, the control circuit 20 then disables the control signal to the ANSam signal sending circuit 10.

Processing from steps S2 to S10 is initialization processing executed by the control circuit 20 in response to the power-ON of the facsimile apparatus.

In step S12, the control circuit 20 determines whether the reception mode set by the operation unit 24 is the automatic reception mode. If YES in step S12, the flow advances to step S16. If the reception mode is determined as the manual reception mode, the flow advances to step S14 to execute another processing.

Figure 5:
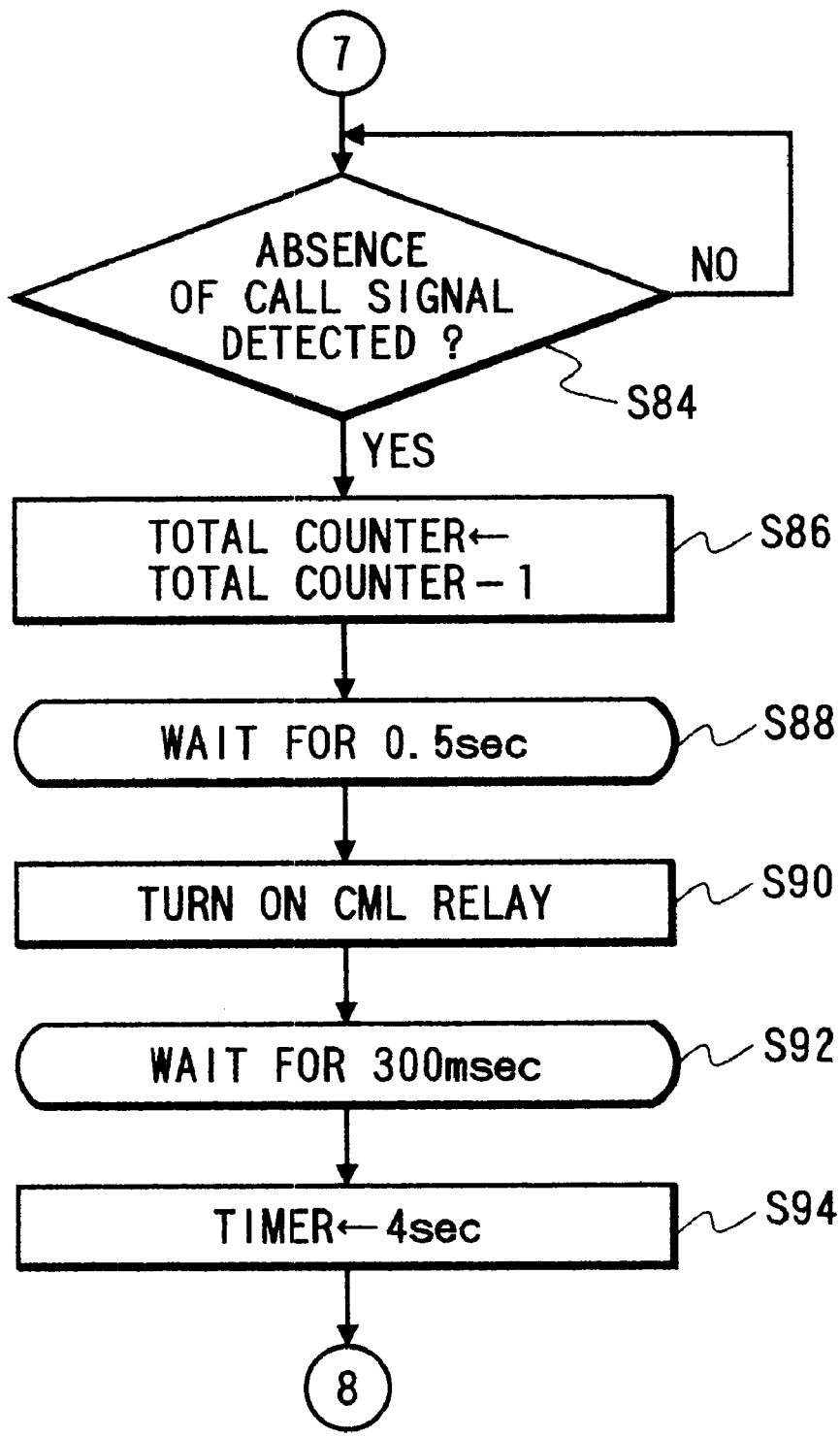
FIG. 5 is a flow chart showing the control operation of the control circuit of this embodiment.

In step 516, the control circuit 20 determines the presence/absence of a detection signal from the call signal detector 22. If the control circuit 20 determines that no call signal is detected, the flow advances to step S14; otherwise, the flow advances to step S18. The control circuit 20 determines in steps S18 and S20 whether the automatic reception control flag values are "1" and "2", respectively. If the automatic reception control flag value is "1", the flow advances from step S18 to step S22. If the automatic reception control flag value is "2", the flow advances from step S20 to step S84 (FIG. 5). Otherwise, the flow returns from step S20 to step S8.

When the automatic reception control flag value is "1", and the flow advances from step S18 to step S22, the control circuit 20 determines on the basis of the detection signal from the call signal detector 22 whether the OFF interval of the call signal from the line 2a is detected. If YES in step S22, the control circuit 20 decrements the value of the total counter in step S24. The control circuit 20 waits for 0.5 sec in step S26 and outputs a control signal to the NCU 2 to turn on the CML relay. The line 2a is switched from the telephone set 4 to the hybrid circuit 6 (facsimile communication unit) to acquire the loop of the line 2a.

In step S30, the control circuit 20 waits until 300 msec (this is not limited to 300 msec, but can be changed by a key input from the operation unit 24) have elapsed. When 300 msec have elapsed, in step S32, the control circuit 20 sets, to 3 sec, the value of a monitor timer (a timer constituted by software using a counter arranged in the RAM) for determining a predetermined period of time for monitoring reception of the CM signal while sending out the ANSam signal. In step S34, the control circuit 20 outputs a control signal to the ANSam signal sending circuit 10 to start sending out the ANSam signal to the line. The control circuit 20 determines in steps S36 and S38 whether the modem 8 receives the CM signal until the time over of the monitor timer. If so, the flow advances from step S36 to step S40. The control circuit 20 receives the demodulated CM signal data from the modem 8 and causes the ANSam signal sending circuit 10 to stop sending out the ANSam signal. The control circuit 20 outputs, to the modem 8, JM signal data in which modulation mode data coincides with the modem function of the partner.

When the flow advances from step S36 to step S40, the control circuit 20 executes the communication sequence of the V. 8 procedure in steps S40 and S42. In step S44, the facsimile communication (data communication) in the modem modulation/demodulation mode determined by the V. 8 procedure is executed. Note that when facsimile communication is designated in semi-duplex communication in accordance with the V. 8 and V. 34 procedures, facsimile communication of the V. 34 procedure is executed in step S44. When data communication is designated in V. 34 full-duplex communication, data communication is executed in the V. 34 full-duplex communication in step S44. When the communication is complete, the flow returns from S44 to step S8.

When the CM signal is not received until the time over of the monitor timer in steps S36 and S38, the flow advances from step S38 to step S46. The control circuit 20 waits for 75 msec in step S46. Upon the lapse of 75 msec, in step S48, the control circuit 20 sets about 35 sec in a timer T1 serving as a timer for monitoring the communication time of the T. 30 procedure. In step S50, the NSF (Non-Standard Facilities)/CSI (Called Subscriber Identification)/DIS (Digital Identification Signal) signal (V. 21 signal) data serving as the procedure signal of the T. 30 procedure is output to the modem 8. The modem 8 outputs the NSF/CSI/DIS signal to the line 2a.

In step S52, the control circuit 20 sets 3 sec in a timer T4 for monitoring reception of the CI signal of the V. 8 procedure and the NSS (Non-Standard Facility Setup)/TSI (Transmission Subscriber Identification)/DCS (Digital Command Signal) signal of the T. 30 procedure. In steps S54, S56, and S58, the control circuit 20 determines the presence/absence of reception of the CI signal until the timer over of the timer T4 and reception of the NSS/TSI/DCS signal. When no signal is received until the time over of the timer T4, the flow advances from step S58 to step S60 to determine whether the time over of the timer T1 is detected. If NO in step S60, the flow returns from step S60 to step S50. The control circuit 20 sends out the NSF/CSI/DIS signal again. If YES in step S60, the flow returns to step S8 to complete communication.

When the control circuit 20 determines reception of the CI signal in step S54, the flow advances to step S68 to decrement the count value of the CI counter. In step S70, it is determined whether the count value of the CI counter is zero. If it is determined in step S70 that the count value of the CI counter is zero, the control circuit 20 sets "2" as the value of the automatic reception control flag in step S72. In step S74, the control circuit sets "30" as the value of the total counter. In step S76, the control circuit 20 sets "20" as the value of the CI counter. In step S78, the control circuit 20 causes the ANSam signal sending circuit 10 to send out the ANSam signal again. In step S80, the control circuit 20 receives the CM signal while sending out the ANSam signal to the line. Upon reception of the CM signal, the flow advances to step S40 to execute the communication sequence of the V. 8 procedure. In step S70, when the count value of the CI counter is not zero, the control circuit 20 determines in step S82 whether the count value of the total counter is zero. If YES in step S82, the flow advances to step S74. If NO in step S82, the flow advances to step S78. In this manner, upon reception of the CI signal, the control circuit 20 causes to transmit the ANSam signal again and execute the communication sequence of the V. 8 procedure.

When the control circuit 20 determines reception of the NSS/TSI/DCS signal in step S56, the control circuit 20 causes to execute the communication sequence of the T. 30 procedure in steps S62, S64, and S66, thereby executing the facsimile communication of the T. 30 procedure. When the facsimile communication of the T. 30 procedure is complete, the flow returns from step S66 to step S8.

When it is determined in step S20 that the value of the automatic reception control flag is "2", the control circuit 20 confirms the OFF interval of the call signal from the line 2a, decrements the count value of the total counter, waits for 0.5 sec, turns on the CML relay, and waits for 300 msec in steps S84, S86, S88, S90, and S92 as in steps S22, S24, S26, S28, and S30. In step S94, the control circuit 20 sets 4 sec as the value of the monitor timer, and the flow advances to step S34.

According to this embodiment, in initial setting, the predetermined period of time for monitoring reception of the CM signal while sending out the ANSam signal is set to, e.g., 3 sec, shorter than 5±1 sec defined in the standard of the V. 8 procedure to allow the shift to the T. 30 procedure within a short time period. In the communication sequence responding to reception, when the communication sequence in which the V. 8 procedure is returned upon reception of the CI signal is executed at a predetermined ratio upon the shift to the T. 30 procedure, the predetermined period of time is changed from, e.g., 3 sec to 4 sec. For this reason, even if the start of the V. 8 procedure is delayed, the predetermined period of time for monitoring the CM signal while sending out the ANSam signal can be appropriately changed so as to execute the V. 8 procedure within a short time period.

In the above embodiment, the time for monitoring reception of the CM signal while sending out the ANSam signal is changed. However, the delay time from line acquisition of the line 2a to the start of transmission of the ANSam signal may be increased.

Figure 6:
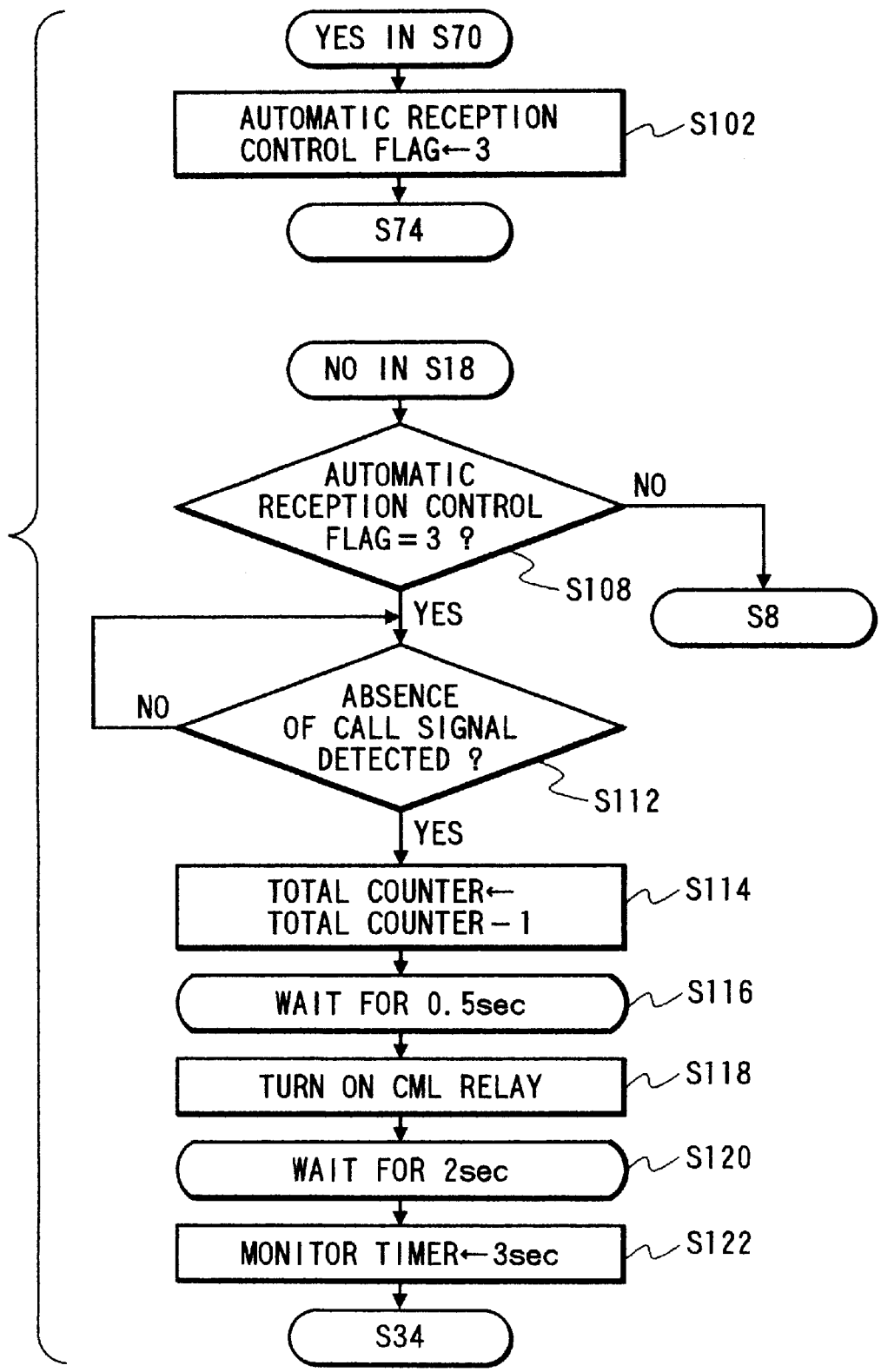
FIG. 6 is a flow chart showing a control operation of the control circuit according to a modification of this embodiment.

FIG. 6 is a flow chart showing a control operation of the control circuit 20 to increase the delay time.

In this case, when the value of the automatic reception control flag is "3", processing for increasing the delay time is executed.

Figure 4:
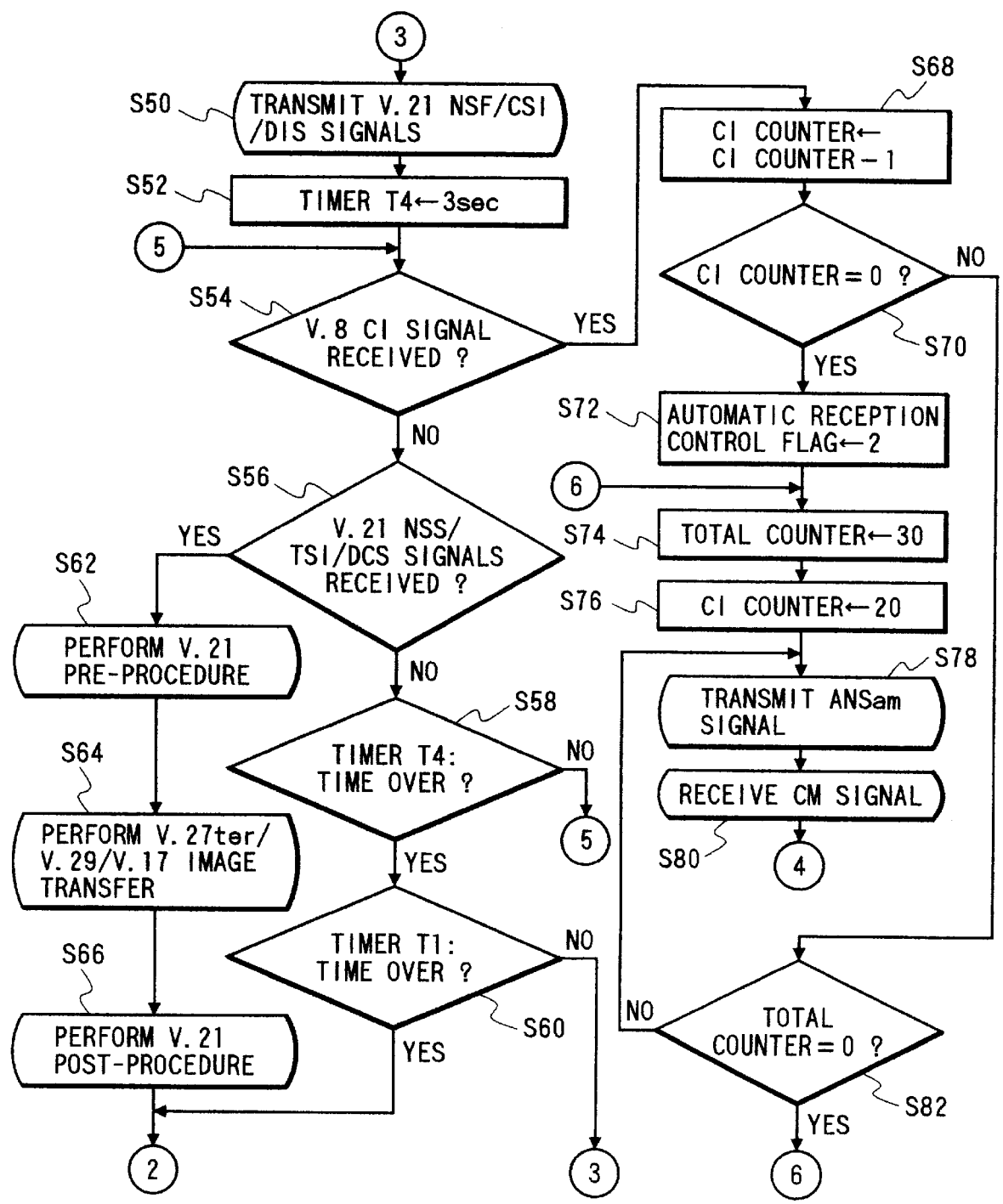
FIG. 4 is a flow chart showing the control operation of the control circuit of this embodiment.

In step S102 of FIG. 6, the control circuit 20 sets the value of the automatic reception control flag as "3" in place of processing in step S72 of FIG. 4.

The control circuit 20 executes processing in step S108 in place of processing in step S20 of FIG. 2. The control circuit 20 determines in step S108 whether the automatic reception control flag value is "3". If NO in step S108, the flow returns to step S8 in FIG. 2. If YES in step S108, the control circuit 20 confirms the OFF interval of the call signal from the line 2a, decrements the count value of the total counter, waits for 0.5 sec, and turns on the CML relay in steps S112, S114, S116, and S118 as in step S22, S24, S26, and S28 of FIG. 2. The control circuit 20 waits for 2 sec in step S120 and sets 3 sec as the value of the monitor timer in step S122. The flow then advances to S34 of FIG. 3.

In the modification of FIG. 6 described above, processing for the value of the automatic reception control flag as "3" is executed in place of processing for the value of the automatic reception control flag as "2" of FIGS. 2 to 5. However, processing operations for the automatic reception control flag values "1" to "3" may be selectively executed.

Figure 7:
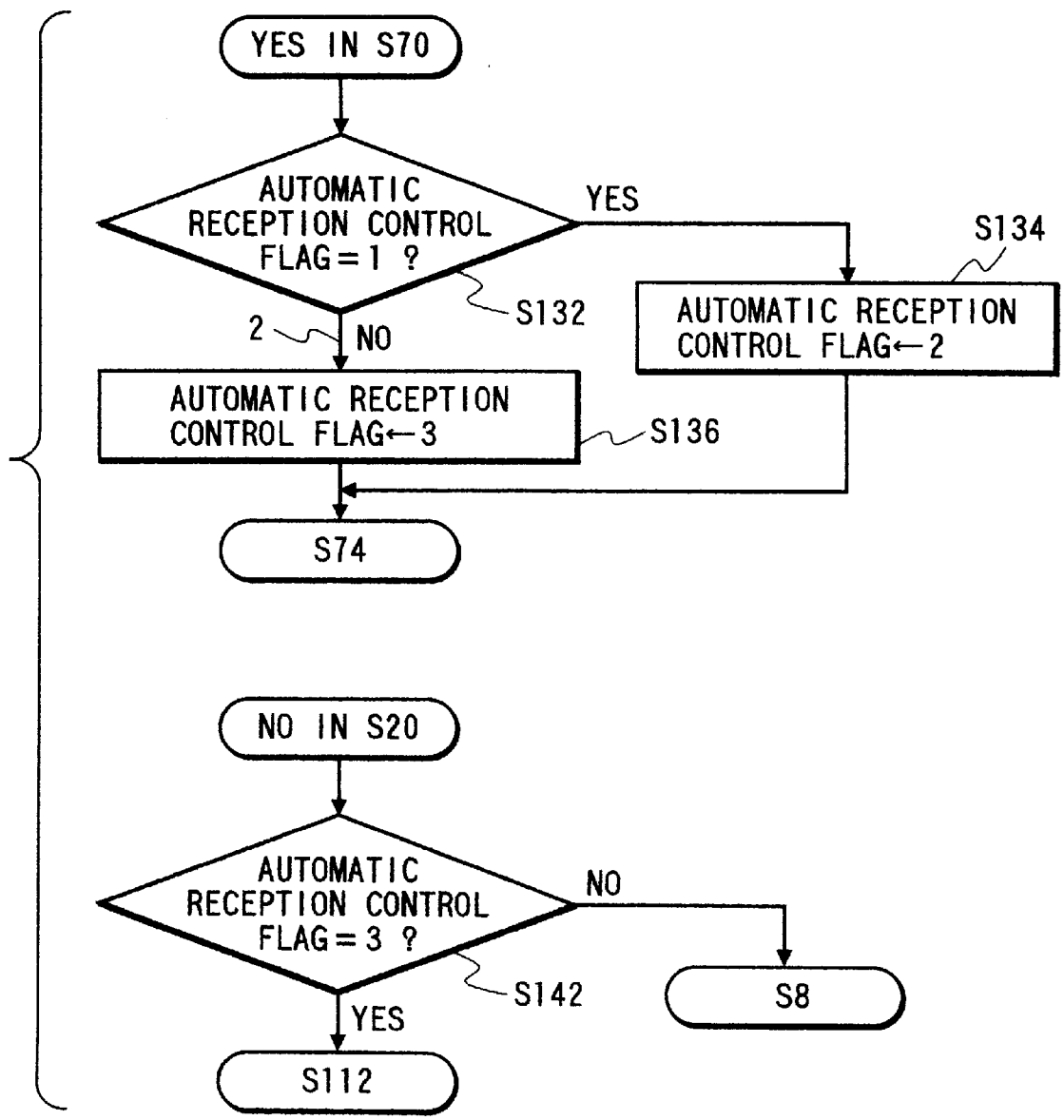
FIG. 7 is a flow chart showing a control operation of the control circuit according to another modification of this embodiment.

FIG. 7 is a flow chart showing a control operation of the control circuit 20 when the processing operations are executed by changing the automatic reception control flag values from "1" to "2" and "2" to "3".

The control circuit 20 determines in step S132 of FIG. 7 whether the automatic reception control flag value is "1" in place of executing processing in step S72 of FIG. 4. If YES in step S132, the control circuit 20 sets the automatic reception control flag value to "2" in step S134, and the flow advances to step S74 in FIG. 4. If NO (the flag value is "2") in step S132, the control circuit 20 sets the automatic reception control flag value to "3" in step S136, and the flow advances to step S74.

When the control circuit 20 determines in step S20 of FIG. 2 that the automatic reception control flag value is not "2", the control circuit 20 executes processing in step S142 of FIG. 7. The control circuit 20 determines in step S142 whether the automatic reception control flag value is "3". If NO in step S142, the flow advances to step S8; otherwise, the flow advances to step S112 in FIG. 6.

In the modification of FIG. 7, the automatic reception control flag value is changed from "1" to "2" and "2" to "3", but may be changed from "1" to "3" and "3" to "2".

Figure 8:
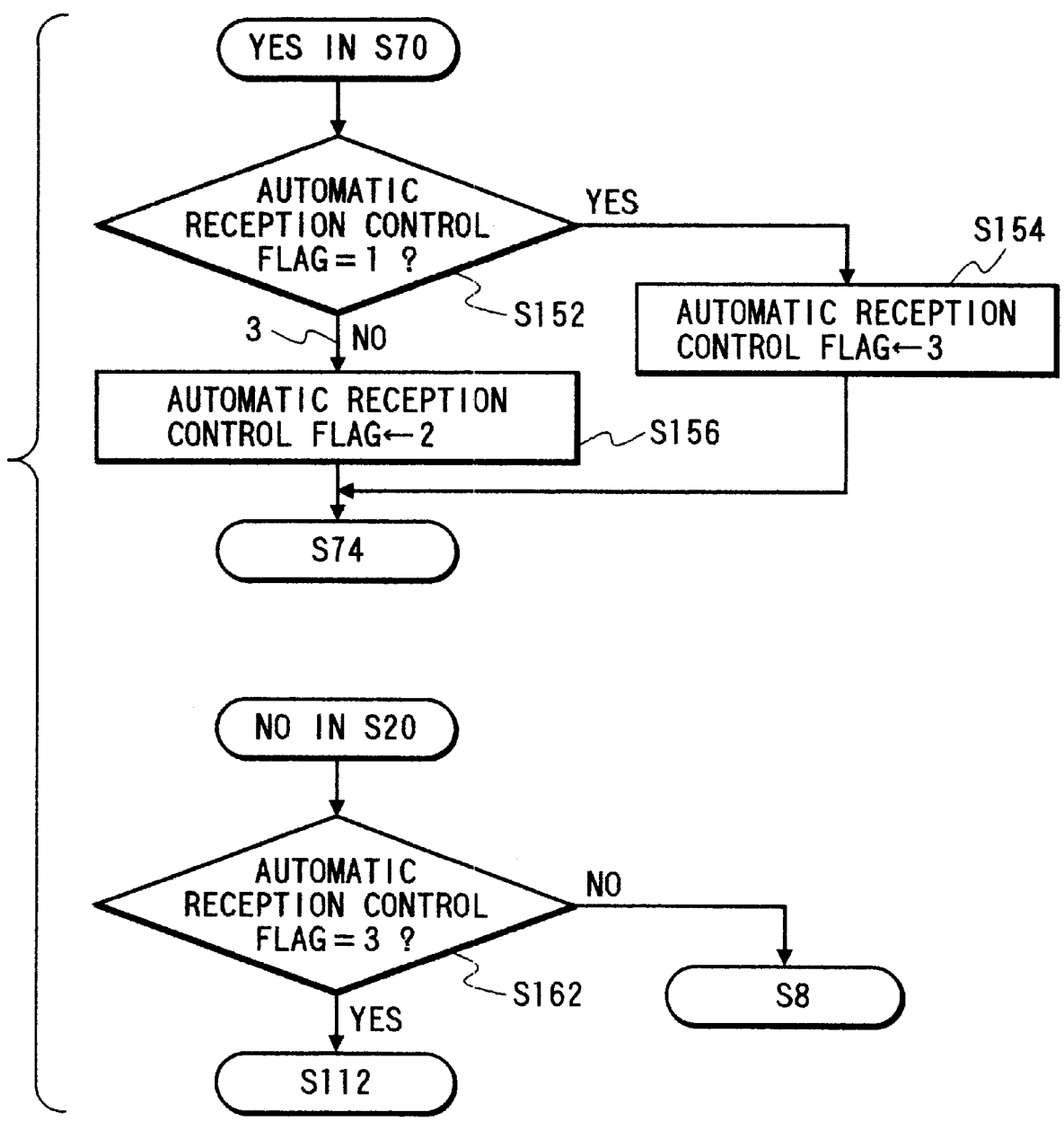
FIG. 8 is a flow chart showing a control operation of the control circuit according to still another modification of this embodiment.

FIG. 8 is a flow chart showing a control operation of the control circuit 20 when the automatic reception control flag value is changed from "1" to "3" and "3" to "2".

Processing in step S134 and processing in step S136 of FIG. 7 are reversed in FIG. 8. In step S152, when the automatic reception control flag value is "1", the automatic reception control flag value is set to "3" in step S154. When the automatic reception control flag value is not "1" (flag value "3") in step S152, the automatic reception control flag value is set to "2" in step S156.

In step S162 of FIG. 8, the control circuit 20 performs the same processing as that in step S142 of FIG. 7.

As processing for the automatic reception control flag value "4", there may be provided processing for increasing the delay time from line acquisition of the line 2a to the start of sending out the ANSam signal and setting the predetermined period of time of the monitor timer for monitoring reception of the CM signal while sending out the ANSam signal from 3 sec to 4 sec. This processing may be selected in addition to the processing operations for the automatic reception control flag values "1" to "3" in FIG. 7.

Figure 9:
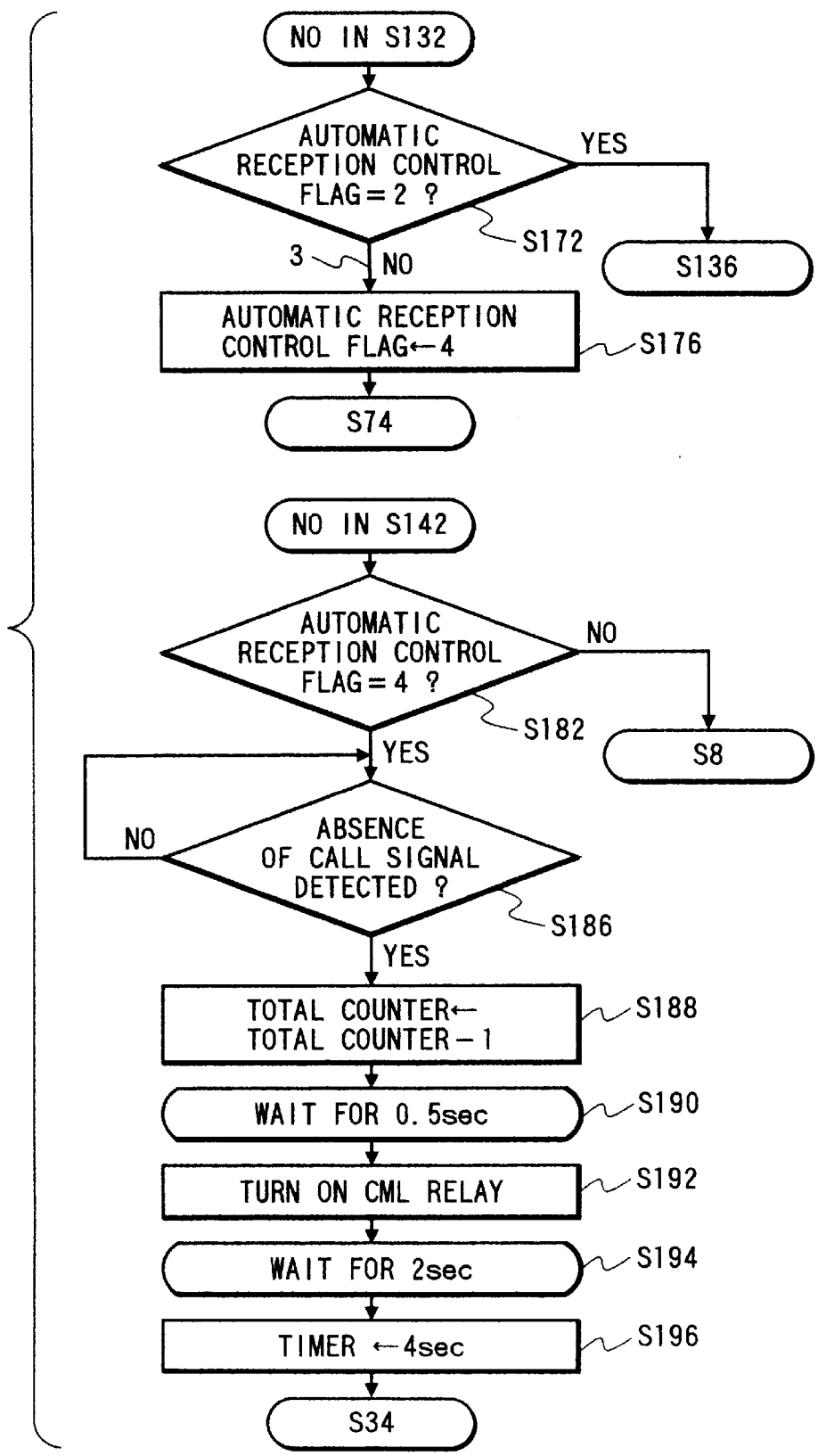
FIG. 9 is a flow chart showing a control operation of the control circuit according to still another modification of this embodiment.

FIG. 9 is a flow chart showing a control operation of the control circuit 20 in a modification for executing corresponding processing operations upon sequential switching between the automatic reception control flag values "1" to "4".

When the control circuit 20 determines in step S132 of FIG. 7 that the automatic reception control flag value is not "1", the control circuit determines in step S172 of FIG. 9 whether the automatic reception control flag value is "2". If YES in step S172, the flow advances to step S136 in FIG. 7; otherwise (flag value "3"), the control circuit 20 sets the automatic reception control flag value to "4" in step S176, and the flow advances to step S74 in FIG. 4.

When the control circuit 20 determines in step S142 of FIG. 7 that the automatic reception control flag is "3", the control circuit 20 determines in step S182 of FIG. 9 whether the automatic reception control flag value is "4". If NO in step S182, the flow advances to step S8 in FIG. 2; otherwise, the control circuit 20 executes processing in steps S186, S188, S190, and S192 as in steps S22, S24, S26, and S28 of FIG. 2. In step S194, the control circuit 20 waits for 2 sec. In step S196, the control circuit 20 sets 4 sec in the monitor timer, and the flow advances to step S34 in FIG. 3.

Figure 10:
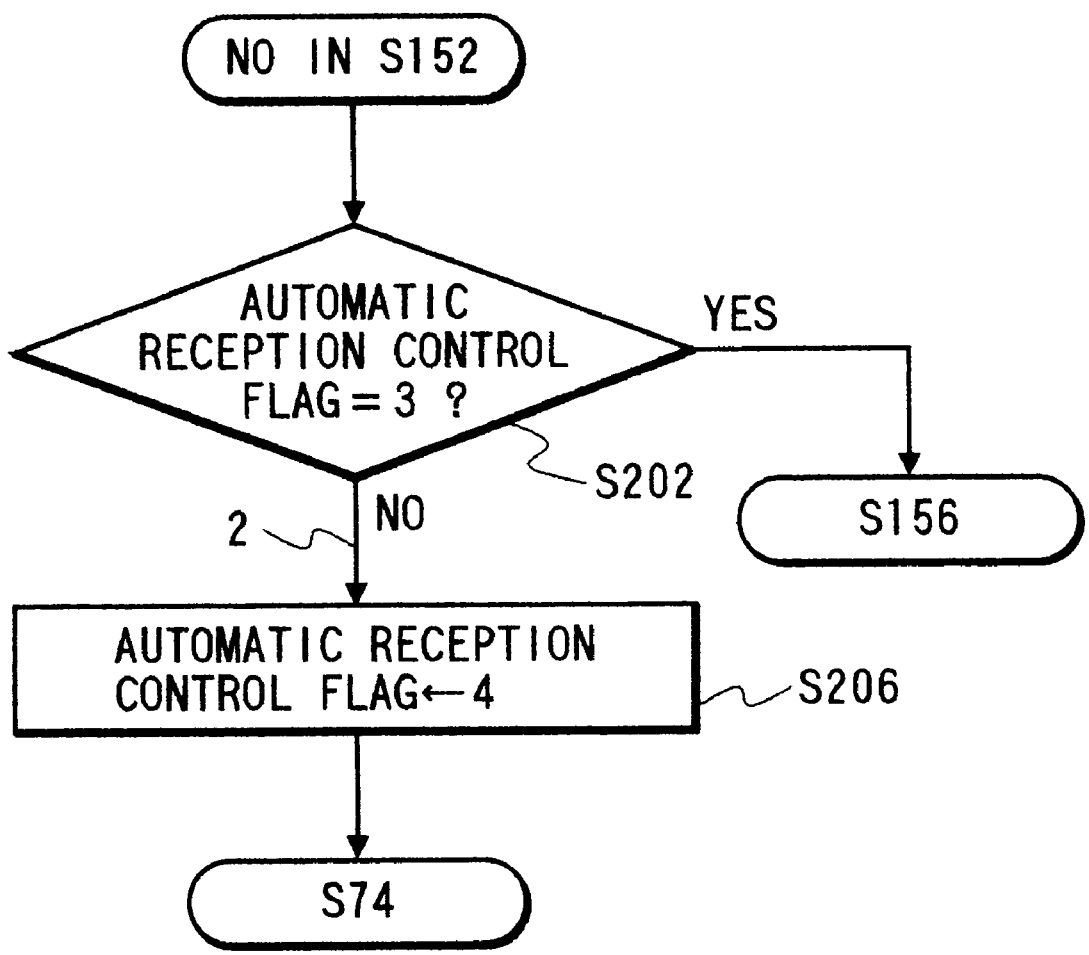
FIG. 10 is a flow chart showing a control operation of the control circuit according to still another modification of this embodiment.

The automatic reception control flag value may be changed from "1" to "3", "3" to "2", and "2" to "4". FIG. 10 is a flow chart showing a control operation of the control circuit 20 for this modification.

When the control circuit 20 determines in step S152 of FIG. 8 that the automatic reception control flag value is not "1", the control circuit determines in step S202 of FIG. 10 whether the automatic reception control flag value is "3". If YES in step S202, the flow advances to step S156 in FIG. 8; otherwise (flag value "2"), the control circuit 20 sets the automatic reception control flag value to "4" in step S206, and the flow advances to step S74 in FIG. 4. When the control circuit 20 determines in step S162 of FIG. 8 that the automatic reception control flag value is not "3", the flow advances to step S182 in FIG. 9.

In the above embodiment and its various modifications, when the communication sequence in which the procedure is returned from the T. 30 procedure to the V. 8 procedure upon reception of the CI signal is executed at a predetermined ratio or more, the monitor timer value is automatically changed (or the delay time from line acquisition to the start of sending out the ANSam signal is changed). However, the value of the monitor timer may be changed (the delay time may be changed) in accordance with a manual operation for inputting a key input from the operation unit 24.

As described above, according to this embodiment, the timer required to shift the procedure from the V. 8 procedure to any other communication procedure in automatic reception can be shortened. When the terminal on the calling subscriber side is a terminal having a communication procedure other than the V. 8 procedure, the V. 8 procedure can be shifted to any other procedure within a short time period upon reception.

When the communication sequence in which the procedure is shifted from the V. 8 procedure to another communication procedure upon automatic reception and is returned to the V. 8 procedure again is to be executed depending on a communication network to which the apparatus is connected, the predetermined period of time for monitoring reception of the CM signal while transmitting the ANSam signal is changed or the delay time from line acquisition to the start of sending out the ANSam signal is changed, thereby performing a change to immediately perform the V. 8 procedure.

The communication sequence can be changed to appropriately perform the V. 8 procedure and any other communication procedure upon automatic reception, depending on the communication network to which the apparatus is connected.

Various changes and modifications may be made without departing the spirit and scope of the invention.

What is claimed is:

1. A communication apparatus with a V. 8 procedure function, comprising:

acquisition means for acquiring a communication line in response to a reception from the communication line;

sending means for sending out, to the communication line, an ANSam signal of the V. 8 procedure in response to the acquisition of the communication line by said acquisition means;

first detection means for detecting a presence/absence of a reception of a CM signal from the communication line during the sending out of the ANSam signal;

control means for continuing a V. 8 procedure sequence when the CM signal is received within a predetermined period of time after starting the sending out of the ANSam signal, and for stopping the sending out of the ANSam signal to shift a sequence from the V. 8 procedure to another communication procedure when the CM signal is not received within the predetermined period of time;

second detection means for detecting that a partner's apparatus is permitted to execute the V. 8 procedure; and changing means for changing the predetermined period of time for monitoring reception of the CM signal while sending out the ANSam signal, in accordance with detection of the permission for the partner's apparatus to execute the V. 8 procedure by means of said second detection means after the sequence is shifted from the V.8 procedure to the other communication procedure by means of said control means.

2. An apparatus according to claim 1, wherein said changing means selects one of a first time coinciding with a sending time of the ANSam signal that is defined in a recommendation of the V. 8 procedure and a second time shorter than the first time.

3. An apparatus according to claim 2, wherein said changing means changes the predetermined period of time from the second time to the first time.

4. An apparatus according to claim 1, wherein said changing means changes the predetermined period of time when the sequence is changed to the other communication procedure and then to the V. 8 procedure.

5. An apparatus according to claim 4, wherein said changing means changes the predetermined period of time when communication in which the sequence is shifted to the other communication procedure in response to a reception and then to the V. 8 procedure is performed a predetermined number of times.

6. A communication apparatus with a V. 8 procedure function, comprising:

acquisition means for acquiring a communication line in response to a reception from the communication line;

sending means for sending out, to the communication line, an ANSam signal of the V. 8 procedure within a first time period after acquisition of the communication line by said acquisition means;

first detection means for detecting a presence/absence of reception of a CM signal from the communication line during the sending out of the ANSam signal;

control means for continuing a V. 8 procedure sequence when the CM signal is received within a second time period after starting the sending out of the ANSam signal and for stopping the sending out of the ANSam signal to shift a sequence from the V. 8 procedure to another communication procedure when the CM signal is not received within the second time period;

second detection means for detecting that a partner's apparatus is permitted to execute the V. 8 procedure; and changing means for changing the first time period, in accordance with detection of the permission for the partner's apparatus to execute the V. 8 procedure by means of said second detection means after the sequence is shifted from the V. 8 procedure to the other communication procedure by means of said control means.

7. An apparatus according to claim 6, wherein the second time period is a time period shorter than a time coinciding with a sending time of the ANSam signal that is defined in a recommendation of the V. 8 procedure.

8. A communication method for a communication apparatus with a function of a V. 8 procedure and a function of another communication procedure different from the V. 8 procedure, comprising the steps of:

acquiring a communication line in response to a reception from the communication line;

sending out an ANSam signal of the V. 8 procedure to the communication line in response to the acquisition of the communication line;

detecting a presence/absence of a reception of a CM signal from the communication line during sending out of the ANSam signal;

continuing a V. 8 procedure sequence when the CM signal is received within a predetermined period of time after starting the sending out of the ANSam signal, and stopping the sending out of the ANSam signal and shifting a sequence from the V. 8 procedure to the other communication procedure when the CM signal is not received within the predetermined period of time;

detecting that a partner's apparatus is permitted to execute the V. 8 procedure; and changing the predetermined period of time for monitoring reception of the CM signal while sending out the ANSam signal, in accordance with the detection of the permission for the partner's apparatus to execute the V. 8 procedure after the sequence is shifted from the V.8 procedure to the other communication procedure by the step of continuing the V. 8 procedure sequence.

9. A method according to claim 8, wherein the step of changing comprises selecting one of a first time coinciding with a sending time of the ANSam signal that is defined in a recommendation of the V. 8 procedure and a second time shorter than the first time.

10. A method according to claim 9, wherein the step of changing comprises changing the predetermined period of time from the second time to the first time.

11. A method according to claim 8, wherein the step of changing comprises changing the predetermined period of time when a sequence is changed to the other communication procedure and then to the V. 8 procedure.

12. A method according to claim 11, wherein the step of changing comprises changing the predetermined period of time when communication in which a sequence is shifted to the other communication procedure in response to a reception and then to the V. 8 procedure is performed a predetermined number of times.

13. An apparatus according to claim 1, wherein said second detection means detects that the partner's apparatus is permitted to execute the V. 8 procedure based on a reception of a CI signal.

14. An apparatus according to claim 6, wherein said second detection means detects that the partner's apparatus is permitted to execute the V. 8 procedure based on a reception of a CI signal.

15. A communication method for a communication apparatus with a V. 8 procedure function, comprising the steps of:

acquiring a communication line in response to a reception from the communication line;

sending out, to the communication line, an ANSam signal of the V. 8 procedure within a first time period after acquisition of the communication line is said acquiring step;

detecting a presence/absence of reception of a CM signal from the communication line during the sending out of the ANSam signal;

continuing a V. 8 procedure sequence when the CM signal is received within a second time period after starting the sending out of the ANSam signal, and stopping the sending out of the ANSam signal to shift a sequence from the V. 8 procedure to another communication procedure when the CM signal is not received within the second time period;

detecting that a partner's apparatus is permitted to execute the V. 8 procedure; and changing the first time period, in accordance with detection of the permission for the partner's apparatus to execute the V. 8 procedure after the sequence is shifted from the V. 8 procedure to the other communication procedure in said step of continuing the V. 8 procedure sequence.

16. A method according to claim 15, wherein the second time period is a time period shorter than a time coinciding with a sending time of the ANSam signal that is defined in a recommendation of the V. 8 procedure.

17. A method according to claim 15, wherein said step of detecting that the partner's apparatus is permitted to execute the V. 8 procedure is based on a reception of a CI signal.

18. A method according to claim 8, wherein said step of detecting that the partner's apparatus is permitted to execute the V. 8 procedure is based on a reception of a CI signal.

* * * * *

UNITED STATES PATENT AND TRADEMARK OFFICE
CERTIFICATE OF CORRECTION

PATENT NO. : 6,021,183

DATED : February 1, 2000

INVENTOR(S) : TAKEHIRO YOSHIDA

It is certified that error appears in the above-identified patent and that said Letters Patent is hereby corrected as shown below:

On the title page item,
[57] ABSTRACT

Line 1, "a" (first occurrence) should be deleted.
    Line 2, "to" should read --to a--.

COLUMN 1

Line 35, "the" should read --a--.

Signed and Sealed this

Thirteenth Day of February, 2001

Attest:

NICHOLAS P. GODICI

Attesting Officer      Acting Director of the United States Patent and Trademark Office